United States Patent
Yamanaka et al.

(10) Patent No.: US 9,001,248 B2
(45) Date of Patent: Apr. 7, 2015

(54) SOLID STATE IMAGING DEVICE WITH ADDITIVE READ MODE

(75) Inventors: Hideki Yamanaka, Yokohama (JP); Hitoshi Nomura, Tokyo (JP)

(73) Assignee: Nikon Corporation, Tokyo (JP)

( * ) Notice: Subject to any disclaimer, the term of this patent is extended or adjusted under 35 U.S.C. 154(b) by 458 days.

(21) Appl. No.: 13/207,895

(22) Filed: Aug. 11, 2011

(65) Prior Publication Data
US 2012/0038808 A1   Feb. 16, 2012

(30) Foreign Application Priority Data

Aug. 16, 2010 (JP) .................................. 2010-181916

(51) Int. Cl.
| | |
|---|---|
| H04N 5/335 | (2011.01) |
| H04N 3/14 | (2006.01) |
| H04N 5/347 | (2011.01) |
| H04N 5/365 | (2011.01) |
| H04N 5/374 | (2011.01) |

(52) U.S. Cl.
CPC ............. *H04N 5/347* (2013.01); *H04N 5/3658* (2013.01); *H04N 5/3742* (2013.01)

(58) Field of Classification Search
CPC ...................................................... H04N 5/347
USPC .......................................................... 348/302
See application file for complete search history.

(56) References Cited

U.S. PATENT DOCUMENTS

| | | | | |
|---|---|---|---|---|
| 7,728,891 | B2 * | 6/2010 | Hiyama et al. ................. | 348/294 |
| 8,508,641 | B2 * | 8/2013 | Uchida .......................... | 348/308 |
| 2010/0053397 | A1 * | 3/2010 | Yanai ............................. | 348/301 |
| 2010/0060754 | A1 * | 3/2010 | Ogura et al. ................... | 348/241 |

FOREIGN PATENT DOCUMENTS

JP    A-63-142781    6/1988

* cited by examiner

*Primary Examiner* — Albert Cutler
(74) *Attorney, Agent, or Firm* — Oliff PLC

(57) ABSTRACT

A solid state imaging device includes a plurality of pixels, a plurality of vertical signal lines, a plurality of sample hold sections, a horizontal output section, and a horizontal scanning circuit. The horizontal output section is made up of a plurality of first horizontal signal lines connected to at least two or more vertical signal lines, and second horizontal signal lines connected to the plurality of first horizontal signal lines via the selection switches. The horizontal scanning circuit controls so that at least two of the plurality of selection switches are turned on and the pixel signal is output to the second horizontal signal lines when the pixel signal held in the sample hold sections is output to the horizontal signal lines.

7 Claims, 5 Drawing Sheets

SOLID STATE IMAGING DEVICE WITH ADDITIVE READ MODE

CROSS REFERENCE TO RELATED APPLICATION

This application is based upon and claims the benefit of priority from Japanese Patent Application No. 2010-181916, filed on Aug. 16, 2010, the entire contents of which are incorporated herein by reference.

BACKGROUND

1. Field

The present application relates to a solid state imaging device.

2. Description of the Related Art

A solid state imaging device has pixels arranged in a 2-dimensional manner. Pixels arranged in a column direction are connected in common to a vertical signal line arranged in the column direction, and signal output from a pixel is read out to the vertical signal line. The signal read out to the vertical signal line is output to a horizontal signal line, via a horizontal selection switch arranged corresponding to the vertical signal line, and is output to the outside of the solid state imaging device, via an output section such as an output amplifier provided at an end of the horizontal signal line.

For such a solid state imaging device, a solid state imaging device employing a multi-stage hierarchical connection structure is proposed as a connection structure with regard to the horizontal signal line between the vertical signal line and the output section (for example, see patent document 1 (Japanese Unexamined Patent Application Publication No. 63-142781)). That is, the connection structure between the vertical signal line and the output section of the solid state imaging device includes two stages of horizontal signal lines (i.e., a plurality of lower stage horizontal signal lines and one upper stage horizontal signal line), and a plurality of horizontal selection switches. A plurality of vertical signal lines is associated with each one of the lower stage horizontal signal lines, and the horizontal selection switches provided to the vertical signal lines on a one-to-one basis provide connection between one of the associated lower stage horizontal signal lines and the plurality of vertical signal lines, respectively. In addition, each lower stage horizontal signal line is connected to the upper stage horizontal signal lines by horizontal selection switches provided to the lower stage horizontal signal lines on a one-to-one basis. One end of the upper stage horizontal signal line has an output section provided thereto for outputting a signal to the outside of the solid state imaging device.

In the solid state imaging device employing the multi-stage hierarchical connection structure with regard to the horizontal signal line described above, performing pixel addition (charge addition) in the horizontal direction on the horizontal signal line causes a vertical stripe to appear as noise, which essentially should not appear in the captured image, thereby resulting in degradation of the image. This will be described in detail below in a comparative example relative to the present application.

The present application has been made in view of the above circumstances, and a proposition of the application is to provide a solid state imaging device which can improve the quality of images obtained by performing pixel addition in the horizontal direction on the horizontal signal line, while employing a multi-stage hierarchical connection structure with regard to horizontal signal lines.

SUMMARY

As means for solving the above problems, the following aspects are proposed. A solid state imaging device according to one aspect includes a pixel section having a plurality of pixels arranged in a 2-dimensional matrix to output a pixel signal according to incident light, and a plurality of vertical signal lines provided corresponding to each column of the pixels, a plurality of sample hold sections provided corresponding to each of the plurality of vertical signal lines to hold the pixel signal, a horizontal output section including a plurality of first horizontal signal lines connected to at least two or more of the plurality of vertical signal lines and a second horizontal signal line connected to the plurality of first horizontal signal lines via selection switches, and a control section controls to turn on at least two or more of the plurality of selection switches and outputs the pixel signal to the second horizontal signal line when the pixel signal held in the sample hold section is output to the first horizontal signal line.

Also, the controls section controls to turn on a same number of the plurality of selection switches and outputs the pixel signal to the second horizontal signal line when the pixel signal held in the sample hold section is output to the first horizontal signal line.

Furthermore, the control section controls to turn on the selection switch connecting the first horizontal signal line to which the pixel signal is not being output and the second horizontal signal line when the pixel signal held in the sample hold section is output to at least one first horizontal signal line of the plurality of first horizontal signal lines.

A solid state imaging device according to a another aspect includes a pixel section having a plurality of pixels arranged in a 2-dimensional matrix to output a pixel signal according to incident light, and a plurality of vertical signal lines provided corresponding to each column of the pixels, a plurality of sample hold sections provided corresponding to each of the plurality of vertical signal lines to hold the pixel signal, a horizontal output section including a plurality of first horizontal signal lines connected to at least two or more of the plurality of vertical signal lines via a first selection switch and a second horizontal signal line connected to the plurality of first horizontal signal lines via a second selection switch, and a control section controls to switch between an additive read control which controls to turn on at least two of the plurality of second selection switches and outputs the pixel signals to the second horizontal signal lines when the pixel signals held in a plurality of sample hold sections are output to the first horizontal signal lines by turning on at least two of the plurality of first selection switches, and an all-pixel read control which controls to turn on the second selection switch connecting the first horizontal signal line to which the pixel signal is output and the second horizontal signal line when the pixel signals held in a plurality of sample hold sections are output to the first horizontal signal lines by turning on the first selection switches one by one.

Also, the solid state imaging device includes two sets including the plurality of sample hold sections and the plurality of first horizontal signal lines.

The present embodiment can provide a solid state imaging device which can improve the quality of images obtained by performing pixel addition in the horizontal direction on the horizontal signal line, while employing a multi-stage hierarchical connection structure with respect to horizontal signal lines.

DETAILED DESCRIPTION OF THE EMBODIMENT

Hereinafter, a solid state imaging device according to the present invention will be described with reference to the drawings.

Figure 1:
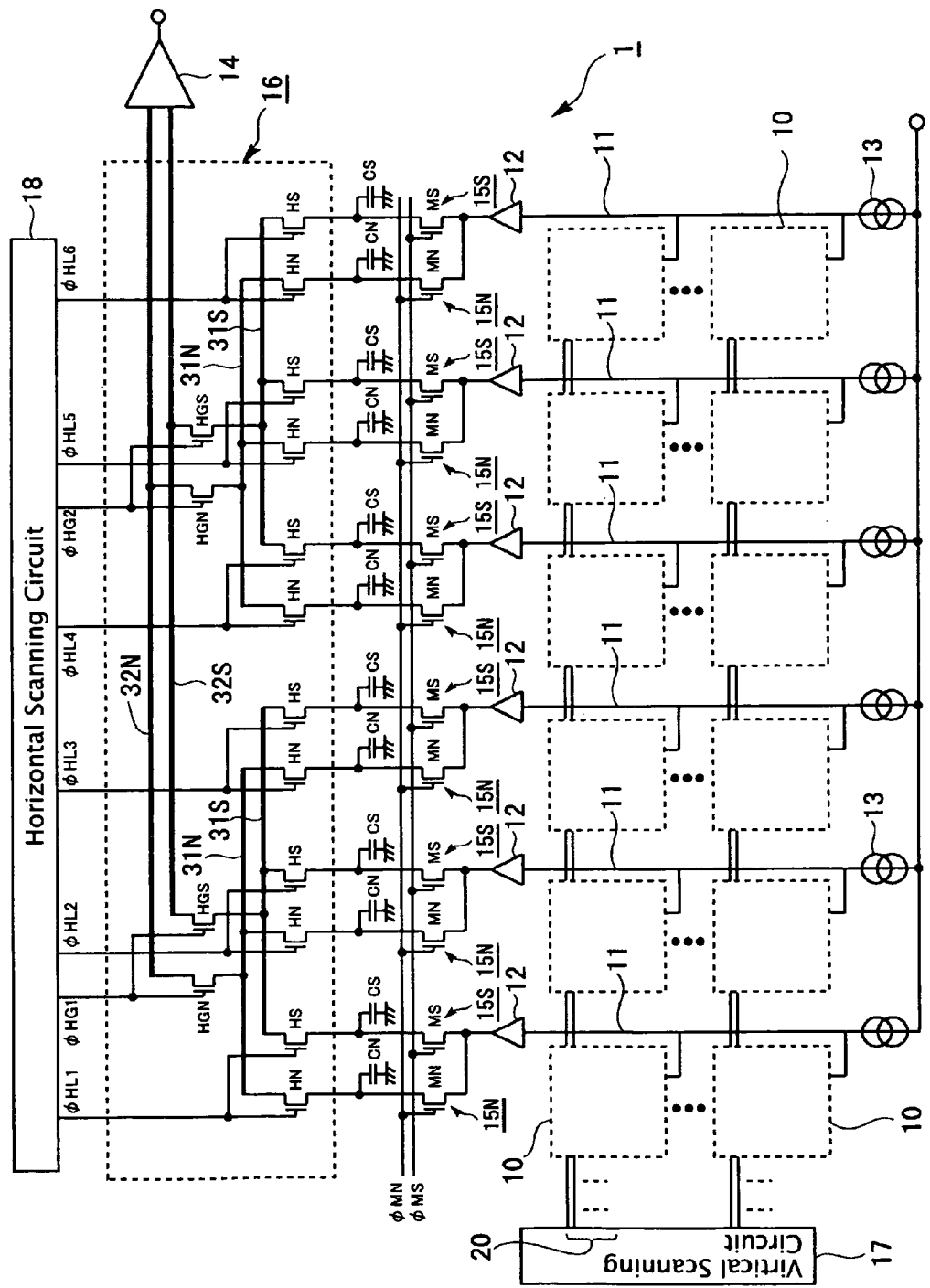
FIG. 1 is a circuit diagram illustrating overall configuration of a solid state imaging device by an embodiment according to the present embodiment.

FIG. 1 is a circuit diagram illustrating overall configuration of a solid state imaging device 1 according to an embodiment of the present invention. A solid state imaging device 1 according to the present embodiment is configured as a CMOS solid state imaging device.

The solid state imaging device 1 includes a pixel section having a plurality of pixels 10 arranged in a 2-dimensional matrix to output a pixel signal according to incident light, and a plurality of vertical signal lines 11 each provided corresponding to each column of the pixels 10 to supply an output signal of a corresponding column of the pixels 10 along which an output signal of a corresponding column of the pixels 10 is supplied; a column amplifier 12 and a constant current source 13 connected to the vertical signal line 11, a differential amplifier 14 operating as an output section which outputs a signal according to an input signal to the outside; a data level sample hold section 15S and a noise level sample hold section 15N connected to an output section of each column amplifier 12; a connection section 16; a vertical scanning circuit 17; and a horizontal scanning circuit 18 operating as a control section which controls the connection state of the connection section 16. FIG. 1 shows 12 pixels with six columns in the horizontal direction and two rows in the vertical direction. However, the number of pixels is not limited to thereto.

Each pixel 10 receives, from a predetermined drive signal line 20, a drive signal output from the vertical scanning circuit 17, is driven thereby, and outputs a signal the vertical signal line 11. There is a plurality of drive signals output from the vertical scanning circuit 17, and accordingly there is also a plurality of drive signal lines 20. Description thereof will be provided below.

Figure 2:
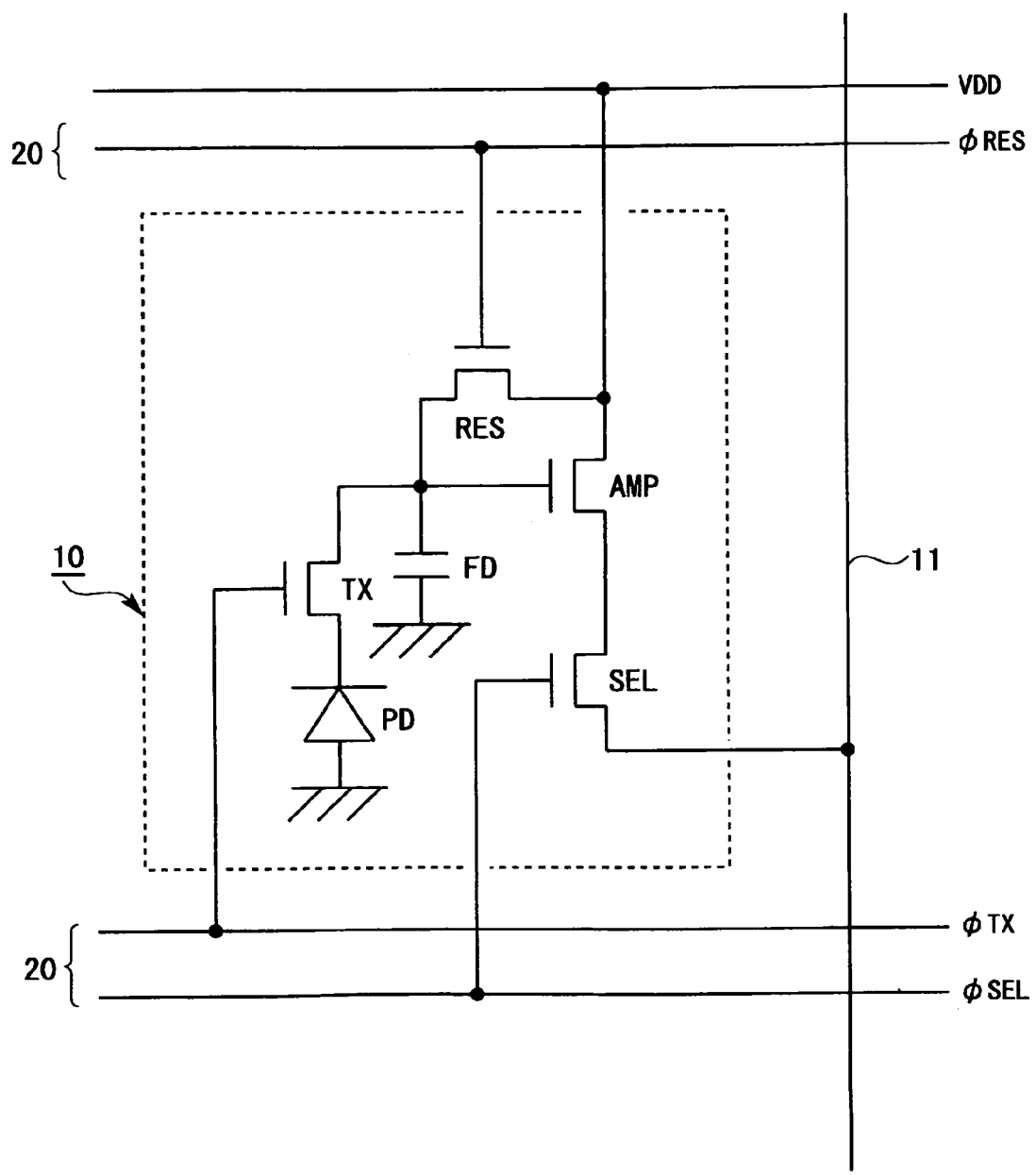
FIG. 2 is a circuit diagram illustrating a pixel in FIG. 1.

FIG. 2 is a circuit diagram illustrating the pixel 10 in FIG. 1. Each pixel 10, as with the general CMOS solid state imaging device, has a photodiode PD operating as a photoelectric conversion section which generates and accumulates charge according to incident light; a floating capacity section FD operating as a charge-voltage conversion section which receives charge and converts the charge into voltage; an amplification transistor AMP as an amplification section which outputs a signal according to the electrical potential of the floating capacity section FD; a transfer transistor TX operating as a charge transfer section which transfers charge from the photodiode PD to the floating capacity section FD; a reset transistor RES operating as a reset section which resets the electrical potential of the floating capacity section FD; and a selection transistor SEL operating as a selection section for selecting the pixel 10, and is connected as shown in FIG. 2. It should be noted that in the present embodiment, the transistors AMP, TX, RES, and SEL of the pixel 10 are all nMOS transistors. In FIG. 2, VDD is the power supply.

The gate of the transfer transistor TX is connected to a drive wiring (wiring among the drive wirings 20) which feeds, to each row, a transfer drive signal φTX from the vertical scanning circuit 17. The gate of the reset transistor RES is connected to a drive wiring (wiring among the drive wirings 20) which feeds, to each row, a drive signal φRES from the vertical scanning circuit 17. The gate of the selection transistor SEL is connected to a drive wiring (wiring among the drive wirings 20) which feeds, to each row, a drive signal φSEL from the vertical scanning circuit 17.

The vertical scanning circuit 17 receives a drive pulse (not shown) from outside the device, and outputs the selection pulse φSEL, the reset pulse φRST, and the transfer pulse φTX, respectively, to each row of the pixel 10.

The data level sample hold section 15S and the noise level sample hold section 15N perform sampling and retention of a signal according to the signal of each vertical signal line 11 (a signal amplified by the column amplifier 12 in the present embodiment, but may be a signal of the vertical signal line 11 without providing the column amplifier 12), according to sampling control signals φMN and φMS. I should be noted that so-called switched capacitor amplifier may be used as the column amplifier.

Each data level sample hold section 15S has a data level retention capacity CS provided corresponding to the vertical signal line 11, and a data level sampling switch MS which accumulates the data level from the pixel 10 (a so-called optical signal, which is a level including the original signal level and noise level) in data level retention capacity CS according to the data level sampling control signal φMS. Each noise level sample hold section 15N has a noise level retention capacity CN provided corresponding to the vertical signal line 11, and a noise level sampling switch MN which accumulates a noise level (so-called dark signal) in the noise level retention capacity CN according to a noise level sampling control signal φMN. The switches MS, and MN are all nMOS transistors.

The gates of respective data level sampling switches MS are connected in common, to which the data level sampling control signal φMS is supplied. When the data level sampling switch MS is turned on in response to the data level sampling control signal φMS, the data level of the signal output from the column amplifier 12 in response to the signal of the vertical signal line is accumulated in the corresponding data level retention capacity CS. The gates of respective noise level sampling switches MN are connected in common, to which the noise level sampling control signal φMN is supplied. When the noise level sampling switch MN is turned on in response to the noise level sampling control signal φMN, the noise level output from the column amplifier 12 in response to the noise level of the vertical signal line is accumulated in the corresponding noise level retention capacity CN.

In the present embodiment, the connection section 16 includes two sets of connection sections, i.e., a data level connection section and a noise level connection section. A data level connection section has two stages of data level horizontal signal lines (i.e., a plurality of lower stage data level horizontal signal lines 31S and an upper stage data level horizontal signal line 32S); a plurality of lower stage data level horizontal selection switches HS providing connection between all the lower stage data level horizontal signal lines 31S, respectively, and the retention capacity CS of all the data level sample hold sections 15S; and a plurality of upper stage data level horizontal selection switches HGS providing connection between all the lower stage data level horizontal signal lines 31S and the upper stage data level horizontal signal line 32S. A data level horizontal output section is made up by the horizontal signal lines 31S and 32S. In the present embodiment, an nMOS transistor is used as the horizontal selection switches HS and HGS. The lower stage data level horizontal selection switch HS is provided to the vertical signal line 11, the column amplifier 12, and the retention capacity CS of the data level sample hold section 15S, on a one-to-one basis. One lower stage data level horizontal signal line 32S is provided corresponding to each bunch of the plurality of vertical signal lines 11 arranged in succession. The retention capacity CS of the same number of data level sample hold sections 15S connected to each of the plurality of vertical signal lines 11 are connected to the corresponding same lower stage horizontal signal line 32S, via the same number of the lower stage data level horizontal selection switches HS, respectively. The plurality of vertical signal lines 11 and one lower stage data level horizontal signal line 32S corresponding thereto, having such a connection relation constitute a group. Here, three vertical signal lines 11 and one lower stage data level horizontal signal line 32S corresponding thereto, having the above-mentioned connection relation constitute a group. However, the number of vertical signal lines 11 constituting a group is not limited thereto and two or more may suffice, and for example, ten may suffice. Further, a plurality of such groups is provided. It should be noted that, in FIG. 1, only two groups are illustrated because of space limitations. However, since, for example, nearly 1000 vertical signal lines 11 are provided, other groups are omitted. Meanwhile, in the timing chart described below, the horizontal scanning period is described on the assumption that the number of groups is two, for convenience of illustration.

The upper stage data level horizontal selection switches HGS are provided to the lower stage data level horizontal signal lines 31S on a one-to-one basis. Each lower stage data level horizontal signal line 31S is connected to the upper stage horizontal signal line 32S, via the upper stage horizontal selection switch HGS. The upper stage horizontal signal line 32S is connected to one input terminal of the differential amplifier 14 operating as a predetermined member.

The noise level connection section is configured in the same way as the data level connection section. That is, the noise level connection section has two stages of noise level horizontal signal lines (i.e., a plurality of lower stage noise level horizontal signal lines 31N and one upper stage noise level horizontal signal line 32N); a plurality of lower stage noise level horizontal selection switches HN providing connection between all the lower stage noise level horizontal signal lines 31N and the retention capacity CN of all the noise level sample hold sections 15N, respectively; and a plurality of upper stage noise level horizontal selection switches HGN providing connection between all the lower stage noise level horizontal signal lines 31N and the upper stage noise level horizontal signal line 32N. The horizontal signal lines 31N and 32N constitute a noise level horizontal output section. In the present embodiment, an nMOS transistor is used as the horizontal selection switches HN and HGN. The lower stage noise level horizontal selection switch HN is provided to the vertical signal line 11, the column amplifier 12, and the retention capacity CN of the noise level sample hold section 15N on a one-to-one basis. One lower stage noise level horizontal signal line 32N is provided corresponding to each bunch of the plurality of vertical signal lines 11 arranged in succession. The retention capacity CN of the same number of noise level sample hold sections 15N connected to each of the plurality of the vertical signal lines 11 is connected to the corresponding same lower stage horizontal signal line 32N, respectively via the same number of lower stage noise level horizontal selection switches HN. The plurality of vertical signal lines 11 and one lower stage noise level horizontal signal line 32N corresponding thereto, having such a connection relation constitute a group.

The upper stage noise level horizontal selection switch HGN is provided to the lower stage noise level horizontal signal line 31N on a one-to-one basis. Each lower stage noise level horizontal signal line 31N is connected to the upper stage horizontal signal line 32N, via the upper stage horizontal selection switch HGN. The upper stage horizontal signal line 32N is connected to the other input terminal of the differential amplifier 14 operating as another predetermined member.

For each column, the gates of the lower stage data level horizontal selection switches HS and the lower stage noise level horizontal selection switches HN are connected in common, and to the connection point, a lower stage horizontal control signal ϕHLm ("m" denotes the m-th signal) of a corresponding column is supplied from the horizontal scanning circuit 18. The gates of the upper stage data level horizontal selection switches HGS and the upper stage noise level horizontal selection switches HGN are connected in common to each connection point corresponding groups of the same the vertical signal lines 11, and to the connection point, an upper stage horizontal control signal ϕHLk ("k" denotes the k-th upper stage) is supplied from the horizontal scanning circuit 18.

As described above, since the connection section 16 in the present embodiment has a multi-stage hierarchical connection structure, signal read-related parasitic capacity can be reduced to realize high speed reading in the same way as the conventional solid state imaging device described above.

Figure 3:
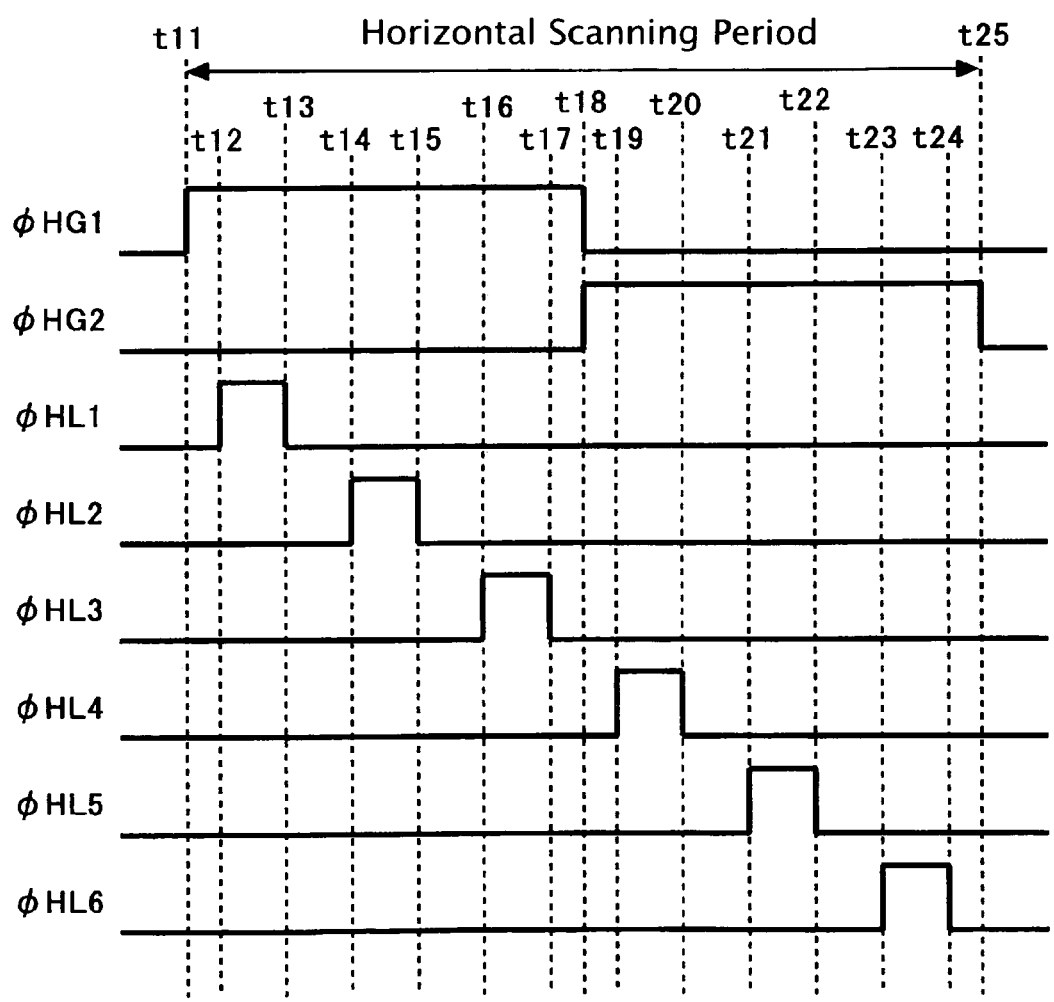
FIG. 3 is a timing chart illustrating a horizontal scanning period in an all-pixel read mode of the solid state imaging device shown in FIG. 1.

FIG. 3 is a timing chart illustrating a horizontal scanning period in the all-pixel read mode of the solid state imaging device 1 according to the present embodiment. In the solid state imaging device 1 according to the present embodiment, in the all-pixel read mode, an operation in the horizontal scanning period shown in FIG. 3 is performed, after the data level and the noise level of each pixel 10 of the selected row have been sampled and accumulated in the retention capacities CS and CN of a corresponding column by an operation during the well-known horizontal blanking period. Subsequently, the horizontal blanking period and the horizontal scanning period are repeated for each row.

In the present embodiment, during a horizontal scanning period t11 to t25, each of the lower stage horizontal control signals ϕHL1 to ϕHL6 is sequentially set to HIGH level, and the lower stage horizontal selection switches HS and HN of each column are sequentially turned on. Additionally, during a period t11 to t18 including a period in which the lower stage horizontal control signals ϕHL1 to ϕHL3 are sequentially turned on (a period in which the lower stage horizontal selection switches HS and HN of the first to third columns are sequentially turned on), the corresponding upper stage horizontal control signal ϕHG1 is set to the high level, the corresponding upper stage horizontal selection switches HGS and HGN are turned on, and the lower stage horizontal selection lines 31S and 31N corresponding to the first to third columns are connected to the upper stage horizontal signal lines 32S and 32N. Additionally, during a period t18 to t25 including a period in which the lower stage horizontal control signals φHL4 to φHL6 are sequentially turned on (a period in which the lower stage horizontal selection switches HS and HN of the fourth to sixth columns are sequentially turned on), the corresponding upper stage horizontal control signal φHG2 is set to the high level, the corresponding upper stage horizontal selection switches HGS and HGN are turned on, and the lower stage horizontal selection lines 31S and 31N corresponding to the fourth to sixth columns are connected to the upper stage horizontal signal lines 32S and 32N.

As a result, during the horizontal scanning period t11 to t25, the data level and the noise level due to each charge that has been accumulated in each of the data level retention capacity CS and the noise level retention capacity CN of the first to sixth columns are sequentially output, for each column, to each of the upper stage data level horizontal signal line 32S and the upper stage noise level horizontal signal line 32N, the differential amplifier 14 acquires the difference between the data level and the noise level, and the difference signal is output from the output terminal. Thereby, correlated double sampling is realized, and the original signal having fixed pattern noises removed therefrom is acquired as an image signal, from the differential amplifier 14. It should be noted that, instead of the differential amplifier 14, two output amplifiers which amplify the signals of the horizontal signal lines 32S and 32N, respectively, may be provided so that the difference between the output signals of the two output amplifiers may be acquired by a differential amplifier or the like provided outside the device.

Meanwhile, in the present embodiment, during the period t1 to T18 in which the upper stage horizontal control signal φHG1 is set to HIGH level, the upper stage horizontal control signal φHG2 is set to LOW level. In addition, during the period t18-T25 in which the upper stage horizontal control signal φHG2 is set to HIGH level, the upper stage horizontal control signal φHG1 is set to LOW level. Accordingly, the lower stage horizontal signal lines 31S and 31N not constituting a signal read path (a connection path between the retention capacities CS and CN, and the upper stage horizontal signal lines 32S and 32N) are configured not to be electrically connected to the upper stage horizontal signal lines 32S and 32N.

Figure 4:
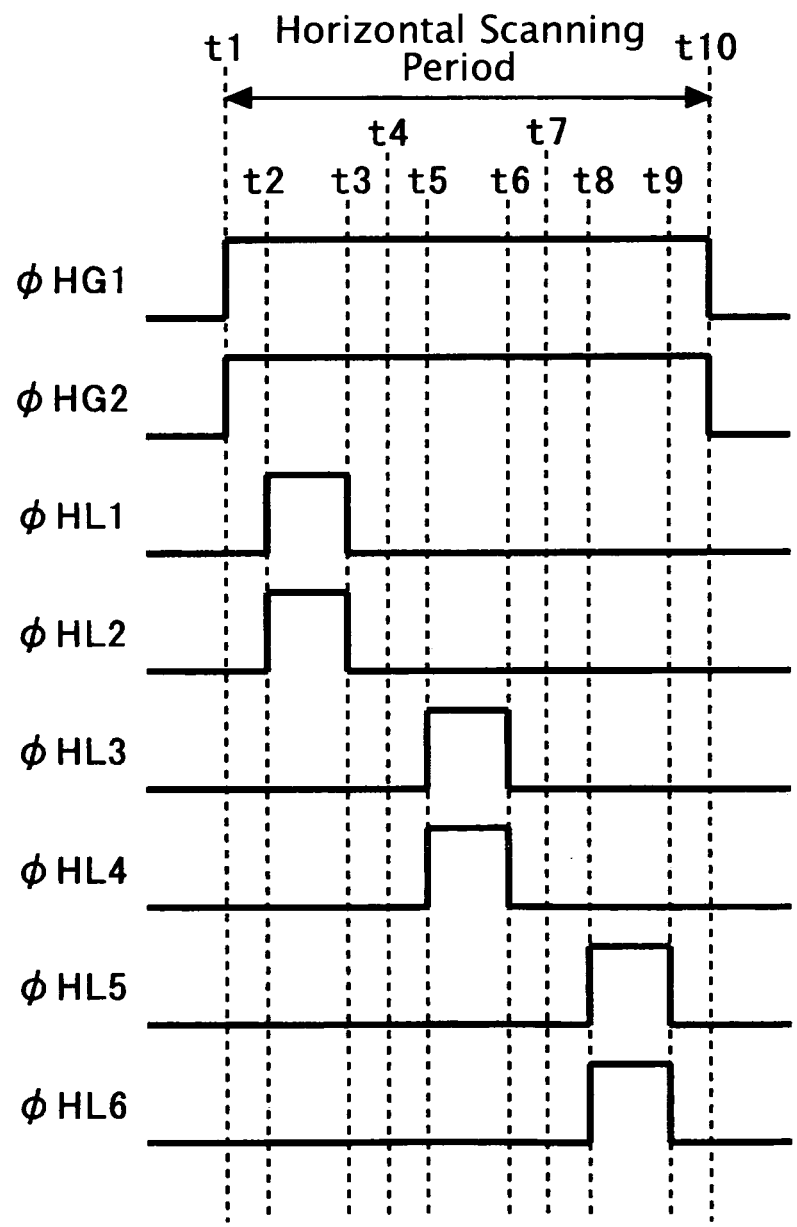
FIG. 4 is a timing chart illustrating a horizontal scanning period in a horizontal pixel additive read mode of the solid state imaging device shown in FIG. 1.

FIG. 4 is a timing chart illustrating a horizontal scanning period in a horizontal pixel additive read mode of the solid state imaging device 1 according to the present embodiment. In the solid state imaging device 1 according to the present embodiment, an operation during the horizontal scanning period shown in FIG. 4 is performed in the horizontal pixel additive read mode, after the data level and the noise level of each pixel 10 of the selected row have been sampled and accumulated in the retention capacities CS and CN of a corresponding column, by an operation during the well-known horizontal blanking period. Subsequently, the horizontal blanking period and the horizontal scanning period are repeated for each row. In the present embodiment, although two pixels adjacent to each other in the horizontal direction are sequentially added, a plurality of pixels which are not in sequence in the horizontal direction may be added and the number of pixels to be added is not limited to two, in the present invention. When constituting a solid state imaging device for a color image, setting of pixels to be added may be performed in consideration of the color arrangement or the like of the pixels.

In the present embodiment, the lower stage horizontal control signals φHL1 and φHL2 are simultaneously set to HIGH level during the period t2 to t3 in the horizontal scanning period t1 to t10, and the lower stage horizontal selection switches HS and HN of the first to second columns are simultaneously turned on. During the period t2 to t3, not only the upper stage horizontal control signal φHG1, but also the upper stage horizontal control signal φHG2 is set to be in high level, and two upper stage data level horizontal selection switches HGS and two upper stage noise level horizontal selection switches HGN are turned on. As a result, not only the lower stage horizontal selection lines 31S and 31N corresponding to the first to third columns constituting a signal read path during this period, but also the lower stage horizontal selection lines 31S and 31N corresponding to the fourth to sixth columns not constituting a signal read path during this period are connected to the upper stage horizontal signal lines 32S and 32N. Therefore, during the period t2 to t3, two lower stage data level horizontal signal lines 31S are connected to the upper stage data level horizontal signal line 32S, and two lower stage noise level horizontal signal lines 31N are connected to the upper stage noise level horizontal signal line 32N.

Because of this connection state, during the period t2 to t3, the addition of the charge which has been accumulated in the retention capacities CS and CN of the first to second columns on the upper stage horizontal signal lines 32S and 32N and the lower stage horizontal signal lines 31 S and 31N connected thereto (the charge addition is referred to as pixel addition) causes the data level and the noise level due to the charge resulting from the addition of the charge which has been accumulated in the retention capacities CS and CN of the first to second columns, to be input to the differential amplifier 14, and causes a difference signal thereof to be output from the output terminal. Accordingly, the addition and correlated double sampling of pixels of the first and second columns is realized.

Next, during the period t5 to t6 in the horizontal scanning period t1 to t10, the lower stage horizontal control signals φHL3 and φHL4 are simultaneously set to HIGH level, and the lower stage horizontal selection switches HS and HN of the third to fourth columns are simultaneously turned on. During the period t5 to t6, the upper stage horizontal control signals φHG1 and φHG2 are set to HIGH level, and two upper stage data level horizontal selection switches HGS and two upper stage noise level horizontal selection switches HGN are turned on. As a result, the lower stage horizontal selection lines 31S and 31N corresponding to the first to third columns constituting one of the signal read paths during the period (signal read paths of the retention capacities CS and CN of the third column), and the horizontal selection lines 31S and 31N corresponding to the fourth to sixth columns of the lower stage constituting the other signal read path during the period (the signal read path of the retention capacities CS and CN of the fourth column) are connected to the upper stage horizontal signal lines 32S and 32N. Therefore, during the period t5 to t6, two data level lower stage horizontal signal lines 31S are connected to the upper stage data level horizontal signal line 32S, and also two lower stage noise level horizontal signal lines 31N are connected to the upper stage noise level horizontal signal line 32N.

Because of this connection state, during the period t5 to t6, the addition of the charge which has been accumulated in the retention capacities CS and CN of the third to fourth columns on the upper stage horizontal signal lines 32S and 32N and the lower stage horizontal signal lines 31 S and 31N connected thereto causes the data level and the noise level due to the charge resulting from the addition of the charge which has been accumulated in the retention capacities CS and CN of the third to fourth columns, to be input to the differential amplifier 14, and causes a difference signal thereof to be output from the output terminal. Accordingly, the addition and correlated double sampling of pixels of the third and fourth columns is realized.

Subsequently, during the period t8 to t9 in the horizontal scanning period t1 to t10, the lower stage horizontal control signals φHL5 and φHL6 are simultaneously set to HIGH level, and the lower stage horizontal selection switches HS and HN of the fifth to sixth columns are simultaneously turned on. During the period t8 to t9, not only the upper stage horizontal control signal φHG2 but also the upper stage horizontal control signal φHG1 is set to HIGH level, and two upper stage data level horizontal selection switches HGS and two upper stage noise level horizontal selection switches HGN are turned on. As a result, not only the lower stage horizontal selection lines 31S and 31N corresponding to the fourth to sixth columns constituting a signal read path during this period, but also the lower stage horizontal selection lines 31S and 31N corresponding to the first to third columns not constituting a signal read path during this period are connected to the upper stage horizontal signal lines 32S and 32N. Therefore, during the period t8 to t9, two lower stage data level horizontal signal lines 31S are connected to the upper stage data level horizontal signal line 32S, and two lower stage noise level horizontal signal lines 31N are connected to the upper stage noise level horizontal signal line 32N.

Because of this connection state, during the period t8 to t9, the addition of the charge which has been accumulated in the retention capacities CS and CN of the fifth to sixth columns on the upper stage horizontal signal lines 32S and 32N and the lower stage horizontal signal lines 31 S and 31 N connected thereto causes the data level and the noise level due to the charge resulting from the addition of the charge which has been accumulated in the retention capacities CS and CN of the fifth to sixth columns, to be input to the differential amplifier 14, and causes a difference signal thereof to be output from the output terminal. Accordingly, the addition and correlated double sampling of pixels of the fifth and sixth columns is realized.

Meanwhile, in the connection section 16, a degree of amplification (referred to as "partition gain" in the following) is caused which is determined by a capacitance partition between a capacitance value of the connected retention capacitance (retention capacitance value) and a load capacitance value of the connected horizontal signal line (horizontal signal line load capacitance value). The partition gain is expressed by the following formula 1.

partition gain=(retention capacitance value)/(horizontal signal line load capacitance value+retention capacitance value)       Formula 1

On the assumption that the capacitance value for one of the retention capacitances CS and CN is 1 pF and the horizontal signal line load capacitance value is 1 pF, partition gain=1/(1+1)=0.5 holds for the horizontal pixel additive read mode, and partition gain=(2×1)/(1+2×1)=2/3=0.67 holds for the horizontal pixel additive read mode (addition of two pixels).

Figure 5:
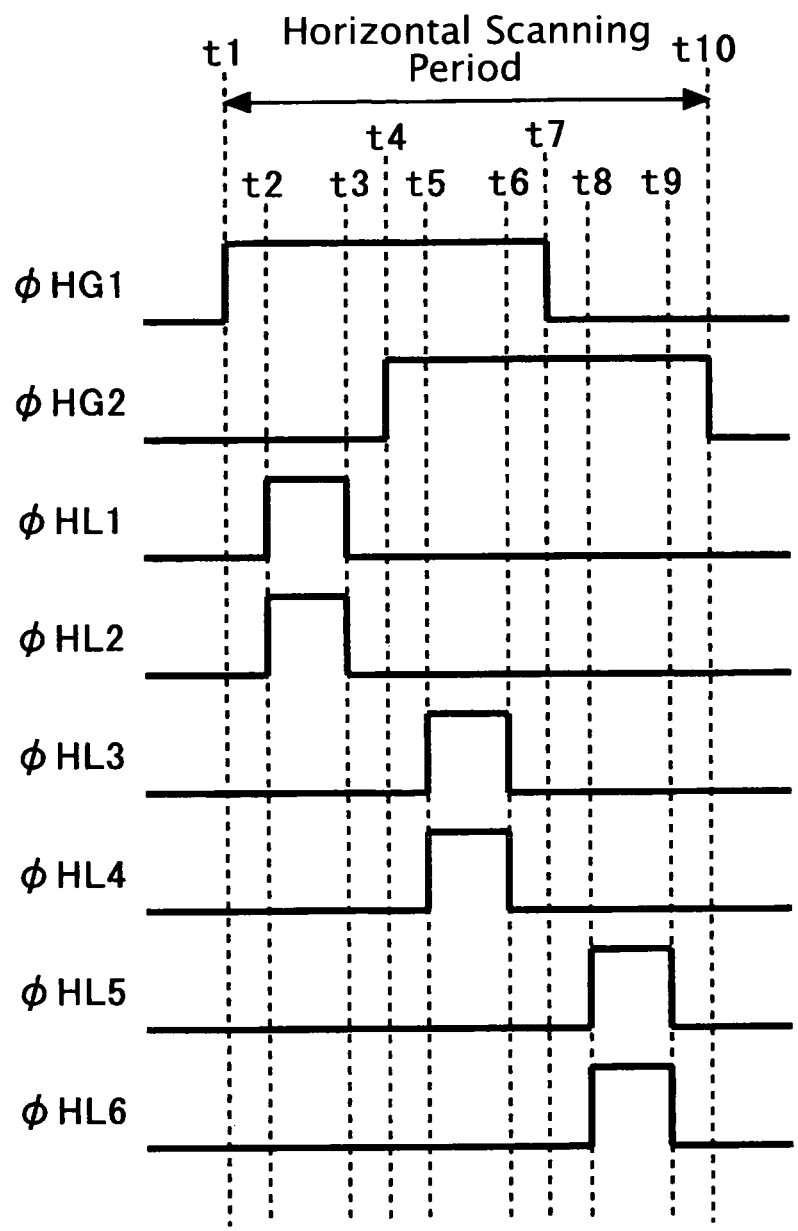
FIG. 5 is a timing chart illustrating a horizontal scanning period in a horizontal pixel additive read mode of a solid state imaging device according to a comparative example.

FIG. 5 is a timing chart and corresponds to FIG. 4, illustrating a horizontal scanning period in a horizontal pixel additive read mode of a solid state imaging device according to a comparative example which is compared with the solid state imaging device 1 according to the present embodiment.

The solid state imaging device according to the comparative example is different from the solid state imaging device 1 according to the present embodiment only in the operation in the horizontal pixel additive read mode. And thus, the only difference between the operation of the comparative example and the operation of the present embodiment lies in that, although the horizontal control signal φHG2 is at HIGH level during the period t1 to t4 and the horizontal control signal φHG2 is at HIGH level during the period t7 to t10 in the present embodiment, the horizontal control signal φHG2 is at LOW level during the period t1 to t4 and the horizontal control signal φHG1 is at LOW level during the period t7 to t10 in the comparative example.

In this comparative example, since the horizontal control signal φHG2 is at LOW level during the period t1 to t4 and the upper stage horizontal control signal φHG2 is at LOW level during the period t2 to t3, the upper stage horizontal selection switches HGS and HGN corresponding to the fourth to sixth columns are turned off during the period t2 to t3. Therefore, during the period t2 to t3, only one upper stage data level horizontal selection switches HGS and one upper stage noise level horizontal selection switches HGN of the upper stage data level horizontal selection switches HGS and HGN are turned on. As a result, the lower stage horizontal selection lines 31S and 31N corresponding to the fourth to sixth columns not constituting a signal read path during the period t2 to t3 are not connected to the upper stage horizontal signal lines 32S and 32N. Accordingly, during the period t2 to t3 in this comparative example, only horizontal selection lines 31S and 31N corresponding to the first to third columns of the lower stage constituting a signal read path during this period are connected to the upper stage horizontal signal lines 32S and 32N. Therefore, during the period t2 to t3, only one data level lower stage horizontal signal line 31S is connected to the upper stage data level horizontal signal line 32S, and only one lower stage noise level horizontal signal line 31N is connected to the upper stage noise level horizontal signal line 32N.

Additionally, in this comparative example, since the horizontal control signal φHG1 is at LOW level during the period t7 to t10 and the upper stage horizontal control signal HG1 is at LOW level during the period t8 to t9, the upper stage horizontal selection switches HGS and HGN corresponding to the first to third columns are turned off during the period t8 to t9. Therefore, during the period t8 to t9, only one upper stage data level horizontal selection switch HGS and one noise level horizontal selection switch HGN of the upper stage data level horizontal selection switches HGS and HGN are turned on. As a result, the lower stage horizontal selection line 31S and 31N corresponding to the first to third columns not constituting a signal read path during the period t8 to t9 are not connected to the upper stage horizontal signal lines 32S and 32N. Accordingly, during the period t8 to t9 in this comparative example, only the horizontal selection lines 31S and 31N corresponding to the fourth to sixth columns of the lower stage constituting a signal read path during this period are connected to the upper stage horizontal signal lines 32S and 32N. Therefore, during the period t8 to t9, only one lower stage data level horizontal signal line 31S is connected to the upper stage data level horizontal signal line 32S, and only one lower stage noise level horizontal signal line 31N is connected to the upper stage noise level horizontal signal line 32N.

It should be noted that the period t5 to t6 is a signal read period of the third and fourth columns, and the signal read path of the third column and the signal read path of the fourth column have mutually different lower stage horizontal signal lines 31S and 31N forming these paths. Therefore, also in both the present embodiment and the comparative example, the upper stage horizontal control signal φHG1 and φHG2 are both set to HIGH level during the period t5 to t6, two upper stage data level horizontal selection switches HGS and two upper stage noise level horizontal selection switches HGN are turned on, two lower stage data level horizontal signal lines 31S are connected to the upper stage data level horizontal signal line 32S, and two lower stage noise level horizontal signal lines 31N are connected to the upper stage noise level horizontal signal line 32N.

In this way, during each of the signal read periods t2 to t3 and t8 to t9 in this comparative example, the number of upper stage data level horizontal selection switches HGS turned on and the number of upper stage noise level horizontal selection switches HGN turned on are respectively one, and the number of lower stage data level horizontal signal lines 31 S connected to the upper stage data level horizontal signal line 32S and the number of lower stage noise level horizontal signal lines 31N connected to the upper stage noise level horizontal signal line 32N are respectively one. In contrast, during the signal read period t5 to t6, the number of upper stage data level horizontal selection switches HGS turned on and the number of upper stage noise level horizontal selection switches HGN turned on are respectively two, and the number of lower stage data level horizontal signal lines 31 S connected to the upper stage data level horizontal signal line 32S and the number of lower stage noise level horizontal signal lines 31N connected to the upper stage noise level horizontal signal line 32N are respectively two.

Therefore, in this comparative example, the horizontal line load capacitance in the connection section 16 during the signal read period t5 to t6 becomes larger than the horizontal line load capacitance during the signal read periods t2 to t3 and t8 to t9, respectively, by an amount equivalent to one upper stage horizontal selection switch and one lower stage horizontal signal line.

Accordingly, the partition gain during the signal read period t5 to t6 (when performing addition of pixels of the third and fourth columns which are crossing over two lower stage horizontal signal lines 31S and 31N) is different from the partition gain during the signal read period t2 to t3 (when performing addition of pixels of the first to second columns which are not crossing over two lower stage horizontal signal lines 31S and 31N), or and the partition gain during the signal read period t8 to t9 (when performing addition of pixels of the fifth to sixth columns which are not crossing over two lower stage horizontal signal lines 31S and 31N).

As a result, even if the entire light receiving area is radiated with a uniform light amount, the occurrence of a difference in partition gains causes vertical stripe which is not supposed to appear in the image captured in the horizontal pixel additive read mode, resulting in degradation of the image.

In the present embodiment, in contrast to this, the horizontal control signal φHG2 is at HIGH level during the period t1 to t4 and the horizontal control signal φHG2 is at HIGH level during the period t7 to t10. Therefore, in the present embodiment, as can be seen from the above description, the number of upper stage data level horizontal selection switches HGS turned on and the number of upper stage noise level horizontal selection switches HGN turned on are respectively two, and the number of lower stage data level horizontal signal lines 31S connected to the upper stage data level horizontal signal line 32S and the number of lower stage noise level horizontal signal line 31N connected to the upper stage noise level horizontal signal line 32N are respectively two, also during each of the signal read periods t2 to t3 and t8 to t9, as with the signal read period t5 to t6.

Therefore, according to the present embodiment, the horizontal line load capacitance during each of the signal read periods t5 to t6, t2 to t3, and t8 to t9, becomes equal, and their partition gains become equal during these signal read periods. No vertical stripe, which would appear in the comparative example, is caused in the image captured in the horizontal pixel additive read mode, resulting in an improved image quality.

Meanwhile, as can be seen from the above-mentioned calculation example of the partition gain, the partition gain in the horizontal pixel additive read mode generally tends to be higher than the partition gain in the above-mentioned all-pixel read mode, also in the present embodiment and the comparative example. This is because the retention capacitance value (total capacitance value of the retention capacitance connected to the horizontal signal line) is increased according to the number of pixels added at the time of pixel addition.

However, the larger the difference between the partition gain in the horizontal pixel additive read mode and the partition gain in the all-pixel read mode, the narrower the dynamic range becomes as long as a process for securing a dynamic range in a later stage circuit after the horizontal signal line (a process of bringing the total gain of one mode closer to the total gain of the other mode) is not performed. To put it another way, the closer the partition gain in the horizontal pixel additive read mode approaches the partition gain in the all-pixel read mode, the wider the dynamic range can be made even without using a specific later stage circuit.

In the comparative example, as can be seen from the above description, the horizontal line load capacitance during each of the signal read periods t2 to t3 and t8 to t9 in the horizontal pixel additive read mode is lower than the horizontal line load capacitance during the signal read period t5 to t6. Therefore, the partition gain during each of the signal read periods t2 to t3 and t8 to t9 is higher than the partition gain during the signal read period t5 to t6. Accordingly, since the difference between the highest partition gain in the horizontal pixel additive read mode (the partition gain during the signal read periods t2 to t3 and t8 to t9) and the partition gain in the all-pixel read mode is large in the comparative example, the dynamic range is narrow unless a specific later stage circuit is used.

In contrast to this, in the present embodiment, the horizontal line load capacitance during each of the signal read periods t2 to t3 and t8 to t9 is raised to become equal to the horizontal signal line load capacitance during the signal read period t5 to t6, by connecting the lower stage horizontal signal lines 31S and 31N not constituting a signal read path to the upper stage horizontal signal lines 32S and 32N during each of the signal read periods t2 to t3 and t8 to t9 in the horizontal pixel additive read mode. Accordingly, in the present embodiment, the partition gain during each of the signal read periods t2 to t3 and t8 to t9 is lowered to become equal to the partition gain during the signal read period t5 to t6. Therefore, according to the present embodiment, the partition gain in the horizontal pixel additive read mode is brought closer to the partition gain in the all-pixel read mode as a result of lowering the highest partition gain in the comparative example.

Therefore, according to the present embodiment, the dynamic range can be expanded without using a specific later stage circuit, in comparison with the comparative example.

For ease of understanding, it is assumed in the description of the present embodiment that there are a small number of pixels, and only two lower stage horizontal signal lines 31S and 31N are provided. In practice, however, there are more pixels and also a larger number of horizontal signal lines 31S and 31N. Therefore, in practice, in the horizontal pixel additive read mode, three or more lower stage horizontal signal lines 31S and 31N may be simultaneously turned on so that the partition gain in the horizontal pixel additive read mode gets closer to the partition gain in the all-pixel read mode.

It should be noted that, if the structure of the horizontal signal line of the connection section 16 is two-tiered, it is desirable to simultaneously turn on the same number of two or more upper stage horizontal selection switches HGS and HGN when adding pixels of either line in order to completely prevent the above-mentioned vertical stripe. However, when obtaining the above-mentioned dynamic range expansion effect without putting emphasis on the effect of reducing vertical stripes, a different number of two or more upper stage horizontal selection switches HGS and HGN may not necessary be simultaneously turned on. For example, there may be cases where four upper stage horizontal selection switches HGS and HGN are simultaneously turned on, or five upper stage horizontal selection switches HGS and HGN are simultaneously turned on, depending on the added pixels.

As described above, embodiments of the present invention have been described, but the present invention is not limited to the embodiments.

For example, although the embodiment described above is an example of a case where a two-tiered connection structure is employed as the connection structure related to the horizontal signal line in the connection section 16, the present invention can be applied to a case where a three- or more tiered connection structure is employed.

In addition, the present invention can be applied to a solid state imaging device having the so-called line select switch which selects read columns. Furthermore, the present invention can also be applied to a solid state imaging device in which the connection section 16 is distributed above and below the effective pixel area.

The many features and advantages of the embodiment are apparent from the detailed specification and, thus, it is intended by the appended claims to cover all such features and advantages of the embodiment that fall within the true spirit and scope thereof. Further, since numerous modifications and changes will readily occur to those skilled in the art, it Is not desired to limit the inventive embodiment to the exact construction and operation illustrated and described, and accordingly all suitable modifications and equivalents may be resorted to, falling within the scope thereof.

What is claimed is:

1. A solid state imaging device comprising:
a pixel section having (i) a plurality of pixels each of which outputs a pixel signal according to incident light, and (ii) a plurality of vertical signal lines each of which outputs the pixel signal read out from a corresponding one or more of the plurality of pixels;
a horizontal output section having (a) a plurality of first horizontal signal lines connected to the plurality of vertical signal lines, and (b) a second horizontal signal line connected to the plurality of first horizontal signal lines via a selection switch provided for each of the first horizontal signal lines, the plurality of first horizontal signal lines being located electrically between the second horizontal signal line and the plurality of vertical signal lines so that the pixel signals are transmitted from the plurality of vertical signal lines to the plurality of first horizontal signal lines and then to the second horizontal signal line; and
a control section which turns on the plurality of selection switches when performing either one of a first mode in which, from among the plurality of first horizontal signal lines, the plurality of pixel signals output to one of the first horizontal signal lines are added and read out, and a second mode in which, from among the plurality of first horizontal signal lines, the plurality of pixel signals output to at least two of the plurality of first horizontal signal lines are added and read out.

2. The solid state imaging device according to claim 1, wherein
the control section controls the selection switches so that a number of the selection switches turned on in the first mode and a number of the selection switches turned on in the second mode are the same.

3. The solid state imaging device according to claim 1, wherein
the control section turns on the selection switch provided on the first horizontal signal line to which the pixel signals are not output in the first mode.

4. A solid state imaging device comprising:
a pixel section having (i) a plurality of pixels each of which outputs a pixel signal according to incident light, and (ii) a plurality of vertical signal lines each of which outputs the pixel signal read out from a corresponding one or more of the plurality of pixels;
a plurality of first horizontal signal lines connected to the vertical signal lines;
a second horizontal signal line connected to the plurality of first horizontal signal lines, the plurality of first horizontal signal lines being located electrically between the second horizontal signal line and the plurality of vertical signal lines so that the pixel signals are transmitted from the plurality of vertical signal lines to the plurality of first horizontal signal lines and then to the second horizontal signal line;
a selection section provided for each of the first horizontal signal lines that sets a state between the first horizontal signal lines and the second horizontal signal line to be one of a conductive state and a non-conductive state; and
a control section that sets the plurality of selection sections to the conductive state when performing either one of a first mode in which, from among the plurality of first horizontal signal lines, the plurality of pixel signals output to one of the first horizontal signal lines are added and read out, and a second mode in which, from among the plurality of first horizontal signal lines, the plurality of pixel signals output to at least two of the plurality of first horizontal signal lines are added and read out.

5. The solid state imaging device according to claim 4, wherein
the control section controls the selection sections so that a number of the selection sections set to the conductive state in the first mode and a number of the selection sections set to the conductive state in the second mode are the same.

6. The solid state imaging device according to claim 5, wherein
the control section sets the selection section provided on the first horizontal signal line to which the pixel signals are not output in the first mode to the conductive state.

7. The solid state imaging device according to claim 4, wherein
the control section sets the selection section provided on the first horizontal signal line to which the pixel signals are not output in the first mode to the conductive state.

* * * * *